STANLEY A. BYNUM
INVENTOR.

BY [signature]
ATTORNEY

United States Patent Office 3,418,508

Patented Dec. 24, 1968

3,418,508
PHOTOCONDUCTIVE LAYER SEPARATED FROM REACTIVE OPAQUE PATTERN BY TRANSPARENT CONDUCTIVE LAYER

Stanley A. Bynum, Dallas, Tex., assignor to General Electrodynamics Corporation, Garland, Tex., a corporation of Texas Continuation-in-part of application Ser. No. 459,778, May 28, 1965. This application Aug. 23, 1967, Ser. No. 662,715

10 Claims. (Cl. 313—65)

ABSTRACT OF THE DISCLOSURE

A dark current reference mask or a reticle pattern formed on the faceplate of a vidicon television camera tube with a material which is normally reactive with a phôtoconductor such as selenium or antimony trisulfide, having a conductive coating covering the mask or reticle pattern which coating is made of a material which does not react with the photoconductor, and a photoconductor such as selenium or antimony trisulfide on the conductive coating.

CROSS REFERENCE TO RELATED APPLICATION

This application is a continuation-in-part of application Ser. No. 459,778 filed May 28, 1965, now abandoned.

BACKGROUND OF THE INVENTION

*Field of the invention*

This invention relates to devices which transduce optical or other radiated images into electrical signals, and more particularly it relates to photoconductive targets of the type that are used in television camera pickup tubes, and to means for causing permanent black image patterns thereon.

*Description of the prior art*

Various electronic devices are known which utilize photoconductive materials for the production of electrical signals from optical images or from images produced by other types of radiation. Among these devices is the vidicon television camera tube, and the following description will be principally in terms of the application of the present invention to the vidicon tube, although, as will become apparent, the invention has equal applicability to many other devices utilizing photoconductive materials. As is well known, and described, for example, in U.S. Patent No. 2,745,032 to Forgue et al., a vidicon camera tube consists of an electron gun and a target assembly contained in a glass envelope, usually about six inches long and one inch in diameter. The electron gun may be of the conventional type used in other types of television pickup tubes. The target assembly usually comprises a film of light-transparent, electrically conductive material on the faceplate of the envelope and a coating of photoconductive material deposited upon the electrically conductive film. The target and the gun are so arranged within the envelope that the electron beam from the gun scans the photoconductive surface of the target.

The use of a dark current reference mask on image pickup devices is a fairly common practice. Such a mask consists of an optically opaque covering over a portion of the photosensitive area of the device. The covered portion is intended to be electrically representative of the dark condition of the photosensitive area. Thus, such a mask permits electrical subtraction, using appropriate circuitry well known in the art, of the electrical signal which represents the no-input condition of the device, this condition being commonly known as the "dark current."

Such a dark current reference mask is particularly useful in eliminating the effect, on an image pickup device, of changes in temperature. The dark current of most image pickup devices increases with increasing ambient temperature so that the total output signal will vary with fluctuations in temperature. It will be apparent that such a condition is highly undesirable in many instances. Another cause of changes in dark current is a change in applied voltage. In image devices such as the vidicon and the image Orthicon increases in the output signal can be achieved by voltage increases in the target voltage, in the case of the vidicon, and in the negative voltage of the photocathode with respect to the collector, in the case of the image Orthicon. Upon increasing the output signal a corresponding increase in dark current will result so that the dark current will constitute a substantial portion of the total output signal. This detrimental condition can be compensated very effectively by the use of a dark current reference mask.

Another application in which a dark current reference mask is useful is shuttered slow scan television. In such applications, the image is picked up during a brief exposure and stored for several seconds or minutes while being read out by an electron beam. During the time required to scan an entire image, the dark signal can increase substantially in the last elements to be scanned over those first scanned. This introduces an apparent defect in the image pickup device, called "shading."

Another instance in which a permanent black image is desired in the picture produced by a television camera tube is when a pattern of reticles is used, for example, for the purpose of forming reference marks which provide a scale of reference for measurement. When the television camera tube is used in a camera for viewing an object having unknown lateral dimensions, such as, for example, configurations on the moon or on various planets, it is highly desirable to provide means for measuring such lateral dimensions. Thus, two optically black signal producing marks may be placed on the faceplate of the camera tube at a known distance apart, and this known distance being reproduced by the receiver can then be used as a scale to determine dimensions of objects viewed by the camera. Such black reticles have been produced in the past by depositing an opaque material in a desired reticle pattern on the faceplate and then depositing the photoconductor on top of the opaque material so that the opaque material will block out light from portions of the photoconductive coating, thereby producing a permanent black image at the location of the reticle on the receiver. In vidicon television camera tubes, opaque materials in the desired black image pattern have been applied on the outside of the transparent window through which the optical image is received so that a desired portion of the photoconductive area is shadowed from the image. This method has a serious drawback in that the opaque material is separated from the photoconductive material by at least the thickness of the transparent window through which the image is admitted. This results in an optical penumbra on the photoconductive material in the region near the edge of the black reference mask or other image pattern. Such a partially shadowed region is rendered useless because it represents neither optical black nor full illumination, and in the case of a very thin reticle mark may cause a lightening of the black image so that the reticle is very difficult to see on the receiver.

Depositing the opaque material on the interior of the transparent window or support so that it is in direct contact with the photoconductive coating has also been found to be unsatisfactory because a permanent electrical indication of optical blackness is not achieved. It has now been found that the direct contact between the opaque material and the photoconductive material is often unsatisfactory because there is a chemical reaction between the opaque materials used and the usual photoconductors such as selenium and antimony trisulfide. This causes a degradation of the photoconductive materials. This degradation manifests itself as either an increase or a decrease in dark current in the area affected, rendering the area useless for establishing a reference level of dark current or for dependable formation of a black reticle or other permanent black image.

SUMMARY OF THE INVENTION

According to the present invention the photoconductive material of the vidicon camera tube or the like is protected from the deteriorating effect of the opaque material, and optical penumbras are avoided, by applying the opaque material in the desired pattern on the face-plate, coating the entire faceplate with a conductive coating which has no deteriorating effect on the photoconductive material, and lastly depositing the photoconductive material on the conductive layer so that the photoconductor is fully insulated from the opaque material which reacts with it. The conductive layer normally used is very thin, usually only a few microns thick, so that the opaque markings are close enough to the photoconductive layer that an optical penumbra problem is avoided.

DESCRIPTION OF THE PREFERRED EMBODIMENTS

Figure 1:
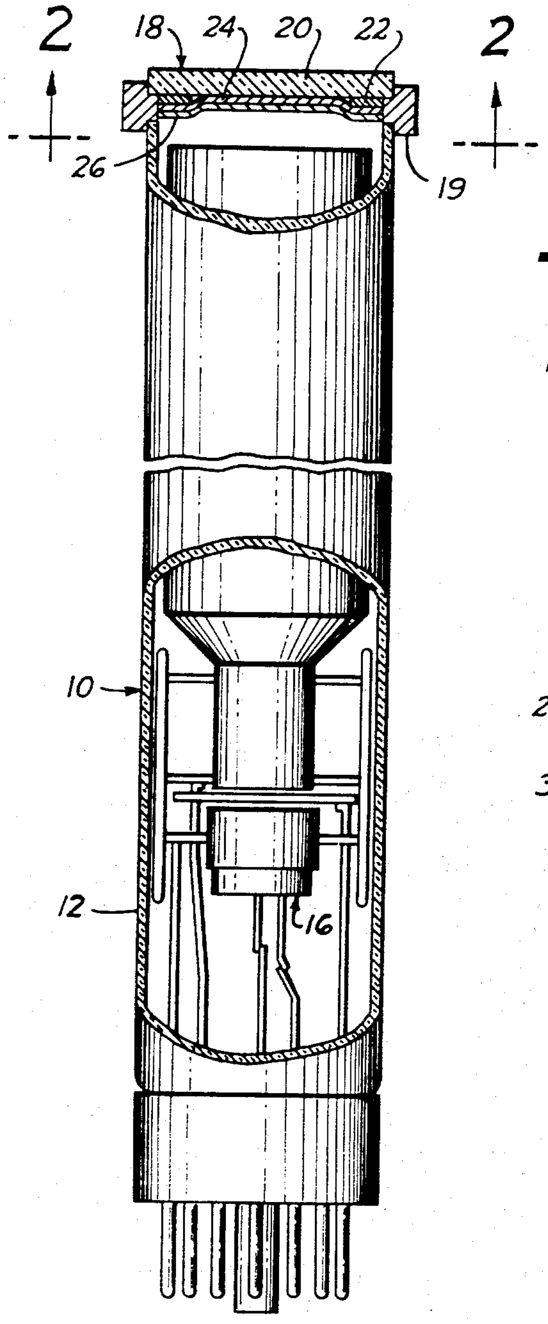
FIGURE 1 shows a longitudinal and partly sectional view of one form of vidicon camera tube embodying the present invention.

FIGURE 1 shows a vidicon type camera tube, indicated generally by the reference numeral 10, which comprises an evacuated envelope 12 having an electron gun 16 in one end thereof. The electron gun 16 may be any of the known types of electron guns and produces an electron beam directed toward the target electrode 18 in the other end of the envelope 12. The electron beam is focused and scanned over the exposed surface of the target electrode by any conventional means (not shown).

The target electrode 18 is attached to a metal ring 19 made of a metal such as Kovar which is sealed, by means well known in the art, to the edge of the target electrode and to the end of the envelope 12. The target electrode comprises a transparent faceplate or substrate 20 preferably made of glass or fused quartz or the like.

According to the present invention, the transparent faceplate has applied directly to its surface an optical mask 22 which comprises a coating of an opaque material around the edges of the circular faceplate and leaving a square or rectangular transparent opening 23. Of course the opaque material may be deposited in any desired configuration so as to form any desired shape of optically black image on the photoconductive layer, such as, for example, a reticle pattern. Applied directly on top of the mask 22 and covering the opening as well as the mask is a transparent conductive layer 24. Lastly, a photoconductive layer 26 is applied directly on top of the conductive layer 24.

The various layers 22, 24, and 26 may be deposited by any convenient means well known in the art, such as, for example, vacuum evaporation, vapor reaction, plating, settling, spraying, or any other method which produces the desired physical and electrical characteristics.

Figure 2:
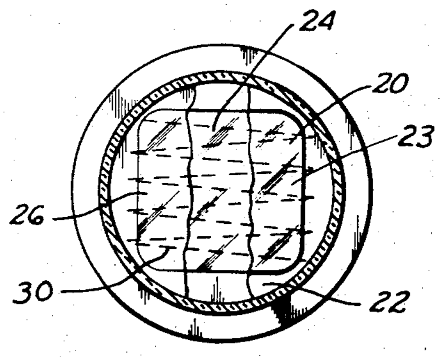
FIGURE 2 shows a faceplate of a vidicon camera tube embodying the present invention, with parts of the coatings broken away.

The preferred opaque materials for use in the practice of the invention are platinum and chromium, and alloys of each, although rhodium, palladium and their alloys also give good results. The metal is deposited in a thickness sufficient to substantially prevent transmission there-through of the particular radiation which it is desired to mask. A preferred manner of accomplishing evaporation in the desired pattern is to apply a contact evaporation mask directly over the portion which is not to be coated by the opaque material. Then the evaporation of the masking material is carried out, following which the evaporation mask is removed, leaving, in the case of a dark current reference mask, the clear window as shown in FIGURE 2. Preferably the evaporation of the opaque material is continued until the opaque material has a thickness sufficient to reduce transmission of radiation to no more than about ½%.

Various transparent conductive layers well known in the art which do not cause degradation of the photoconductors with which they are used may be used for the layer 24 herein. For example, tin oxide and indium sesquioxide are chemically and electrically non-reactive with photoconductors such as antimony trisulfide and selenium. The photoconductive layer is then applied on top of the transparent conductive layer. Thus, photoconductors such as antimony trisulfide and selenium, which would normally be degraded by interaction with such opaque materials as platinum, chromium, rhodium, palladium and alloys of each, are fully protected from such interaction.

To utilize the mask layer 22 as an optically black reference mask in a vidicon, the scanning pattern 30 of the electron beam, as somewhat diagrammatically illustrated in FIGURE 2, should overlap the opaque material a small amount. Thus, the signal generated when the electron beam is impinging on the opaque material may be used as a reference to indicate substantially complete absence of the radiation being viewed, and suitable electronic subtraction equipment (not shown) may compare the signal with the signals generated during the remainder of the scan so that these signals will be more truly indicative of the image being scanned. If the electron beam scans a portion of the masked area on each traverse of the opening or window 23, then the reference signal level will be adjusted on each traverse to compensate for any changed conditions which may be encountered.

I do not wish to be bound by a particular theory as to the reason for the problem solved by the present invention. However, it is believed that many of the opaque materials normally used to block out light from areas of a photoconductor undergo spontaneous chemical reaction with the photoconductors, thereby degrading the performance of the photoconductors. Furthermore, it is believed that transparent conductive coatings such as tin oxide and indium sesquioxide do not react spontaneously with photoconductors, so that the transparent conductive layer will form a protective overlay for the opaque material and prevent reaction with accompanying degradation of the photoconductive layer. This theory appears to be confirmed by analysis of various possible combinations of materials in the light of the principle of thermodynamic which states that a chemical reaction will proceed spontaneously in the direction of the smallest (or greatest negative) total heat content (enthalpy) for all reactants and for all reaction products respectively. This total heat content can be computed for each direction of a chemical reaction from the heats of formation of the compounds formed in the reaction, multiplied by the number of moles of each compound. For example, in the reaction:

$$A+BC \leftrightharpoons AB+C$$

if the heat of formation of compound AB is more negative than that of compound BC, then the reaction will proceed spontaneously to the right.

This theory is applied in the following two groups of calculations of the total heat contents for various reactions. Sources in chemical literature for the various heats for formation are given. The first group of reactions is between various opaque materials and photoconductors and the second group is between various transparent conductive materials and photoconductors.

*Group I.*—Each reaction shown includes an opaque material and a photoconductor on the left side of the equation and possible reaction products on the right side. Note that although more than one chemical reaction is possible between each pair, if any reaction between each pair is spontaneous then the photoconductor is degraded. Therefore, a computation is made for only one of the possible reactions in each case. Values for heats of formation are in kilogram-calories per mole.

(A) Chromium (and chromium alloys) and antimony trisulfide:

$$3Cr+Sb_2S_3 \leftrightharpoons 3CrS+2Sb$$

Heat of formation:

| | |
|---|---|
| [1]−36.0 | [2]−30.0 |
| | ×3 |
| | −90.0 |

The right side is more negative, therefore reaction is spontaneous to the right.

(B) Platinum and antimony trisulfide:

$$3Pt+Sb_2S_3 \leftrightharpoons 3PtS+2Sb$$

Heat of formation:

| | |
|---|---|
| −36.0 | [1]−20.8 |
| | ×3 |
| | −62.4 |

Again, the right side is more negative, so reaction is spontaneous to the right.

(C) Chromium (and chromium alloys) and selenium (and mixtures):

No thermodynamic data are available from literature for the feasibility of reaction between chromium and selenium but the synthesis of the compound chromium selenide from the elements is well known.[3]

(D) Platinum and selenium (and mixtures):

No thermodynamic data are available from the literature but many workers have reported the reaction of platinum with selenium.[4]

*Group II.*—In the following equations a transparent conductive material and a photoconductor are shown on the left side of the equation and a set of reaction products on the right side. Note that in order to insure that the present invention will perform properly no chemical reaction must take place. That is, any reaction that can be written must have a more negative value for total heat content on the left side of the equation than on the right. Because of the number of possible reactions, it is not considered necessary to set forth all of these. One example of reaction product for each combination of materials will suffice to show the principle.

(A) Tin oxide and antimony trisulfide:

$$4Sb_2S_3+9SnO_2 \leftrightharpoons 2Sb_4O_6+9SnS+3SO_2$$

Heats of formation:

| | | | | |
|---|---|---|---|---|
| [1]−36.0 | −138.8 | [1]−336.8 | −18.6 | −79.96 |
| ×4 | ×9 | ×2 | ×9 | ×3 |
| −144.0 | −1249.2 | −673.6 | −167.4 | −112.88 |
| Total: −1393.2 | | −953.88 | | |

The left side is more negative than the right, therefore the reaction would not proceed spontaneously to the right. Furthermore, all thermodynamic data available indicate that there would be no reaction between tin oxide and antimony trisulfide.

(B) Indium sesquioxide and antimony trisulfide:

In this case thermodynamics calculations yield an uncertain result, in that the difference in total heat for each side of the reaction is very small. However, laboratory experiments with such coatings in combination show that if any reaction takes place it is negligible for the purposes of this invention.

(C) Tin oxide and selenium (and mixtures):

$$SnO_2+Se \leftrightharpoons Sn+SeO_2$$

Heat of formation: [1]−138.8 [1]−55.0

The left side is more negative than the right, therefore there is no reaction between tin oxide and selenium.

(D) Indium sesquioxide and selenium (and mixtures):

Thermodynamic data are not available from the literature on the selenides of indium. However, the heat of formation of $In_2O_3$ is even more negative than $SnO_2$. Laboratory tests show no detectable reaction.

Thus, it is seen that the photoconductor is protected from opaque materials reactive therewith by covering the opaque material with a conductive coating which is non-reactive.

Photoconductors which may be degraded by opaque materials includes antimony trisulfide, selenium, and mixtures containing selenium. Such mixtures include, for example mixtures of selenium and sulfur.

It should be understood that the term "optical" as used herein refers to the general region of the electromagnetic spectrum which includes the ultraviolet region, invisible light region, and the infrared region. Furthermore, the term "opaque" is intended to mean substantially non-transparent with respect to the radiation which is to be viewed by the device.

Although preferred embodiments of this invention have been shown and described herein, the invention is not limited to such embodiments, but only as set forth by the following claims.

I claim:

1. A photosensitive target comprising
a transparent substrate,
an opaque material deposited in a pattern of a desired configuration on said substrate,
a transparent conductive coating covering said opaque material, and
a photoconductive layer on said conductive layer,
said opaque material being chemically or electrically reactive with the photoconductive material,
and said conductive layer being chemically and electrically non-reactive with the photoconductive material.

2. A photosensitive target as defined by claim 1 wherein the opaque material forms a dark current reference mask directly on the substrate.

3. A photosensitive target as defined by claim 1 wherein the opaque material is platinum, chromium, rhodium, palladium or an alloy of one or more of them, the conductive coating is tin oxide or indium sesquioxide, and the photoconductive material is antimony trisulfide, selenium, or mixtures containing selenium.

4. A vidicon tube comprising
an evacuated envelope,
a target in one end of said envelope, and
an electron gun in said envelope for producing an electron beam to scan said target,
said target comprising
a transparent substrate,
an opaque material deposited in a pattern of a desired configuration on said substrate on the side toward said electron gun,
a transparent conductive coating on said substrate covering said opaque material and the scanned area of said target, and
a photoconductive coating on said conductive coating,
said conductive coating being chemically and electrically non-reactive with said photoconductive coating, and said opaque material being one which is chemically or electrically reactive with the material of said photoconductive coating.

[1] NBS Bulletin #500 (February 1952).
[2] Moody and Thomas, J. Chem. Soc. 86, 1417 (1964).
[3] Gmelin, v. 8, part B, 338 (1962 ed.).
[4] Mellor, A Comprehensive Treatise of Inorganic Chemistry.

[1] NBS Bulletin #500 (February 1952).

5. A vidicon tube as defined by claim 4 wherein said opaque material defines a transparent window, and said electron beam scans an area of said target which overlaps the edges of said window.

6. A photosensitive target comprising
- a transparent substrate,
- an opaque material formed in a pattern on said substrate,
- a layer of transparent conductive material selected from the group consisting of tin oxide and indium sesquioxide covering said opaque material, and
- a photoconductive layer on said conductive layer,
- said opaque material being one which is chemically or electrically reactive with the photoconductive material.

7. A photosensitive target as defined by claim 6 wherein the opaque material is selected from the group consisting of chromium, platinum, rhodium, palladium and alloys of each.

8. A vidicon tube comprising
- an evacuated envelope,
- a target in one end of said envelope, and
- an electron gun in said envelope for producing an electron beam to scan said target,
- said target comprising
- a transparent substrate,
- an opaque material deposited in a pattern of a desired configuration on said substrate on the side toward said electron gun,
- a layer of transparent conductive material selected from the group consisting of tin oxide and indium sesquioxide on said substrate covering said opaque material and the scanned area of said target, and
- a photoconductive coating on said conductive coating.

9. A vidicon tube as defined by claim 8 wherein the opaque material is selected from the group consisting of chromium, platinum, rhodium, palladium and alloys of each.

10. A vidicon tube as defined by claim 9 wherein the photoconductive coating is selected from the group consisting of antimony trisulfide, selenium, and mixtures containing selenium.

References Cited

UNITED STATES PATENTS

| | | | |
|---|---|---|---|
| 2,851,625 | 9/1958 | Ruedy et al. | 313—65 |
| 2,875,359 | 2/1959 | Cope | 313—94 X |
| 3,001,012 | 9/1961 | Braicks | 178—5.4 |
| 3,026,416 | 3/1962 | Weimer | 250—211 |
| 3,290,530 | 12/1966 | Heagy | 313—65 |
| 3,310,700 | 3/1967 | Dresner et al. | 313—94 X |

OTHER REFERENCES

RCA Technical Notes, RCA TN No. 123, 1958; Gray, "Vidicon With Target Reticle."

ROBERT SEGAL, *Primary Examiner.*

U.S. Cl. X.R.

313—109.5